Oct. 9, 1934.  W. D. FOSTER  1,975,782
MAGAZINE FOR FEEDING MATERIAL
Filed July 14, 1931   2 Sheets-Sheet 1
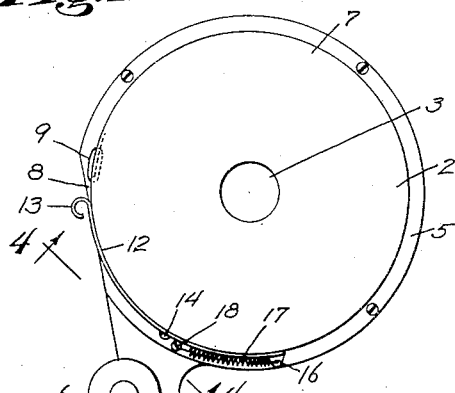
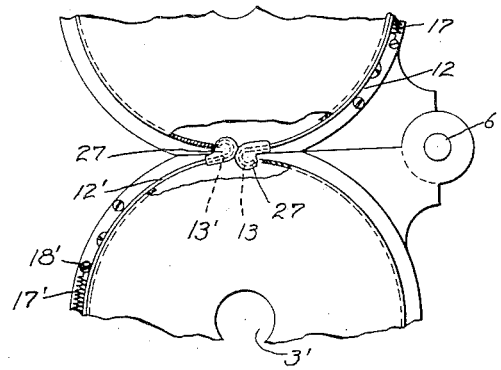
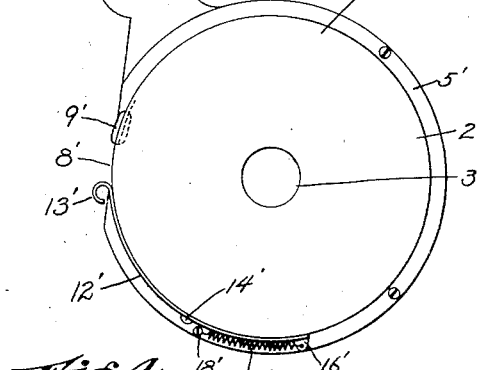
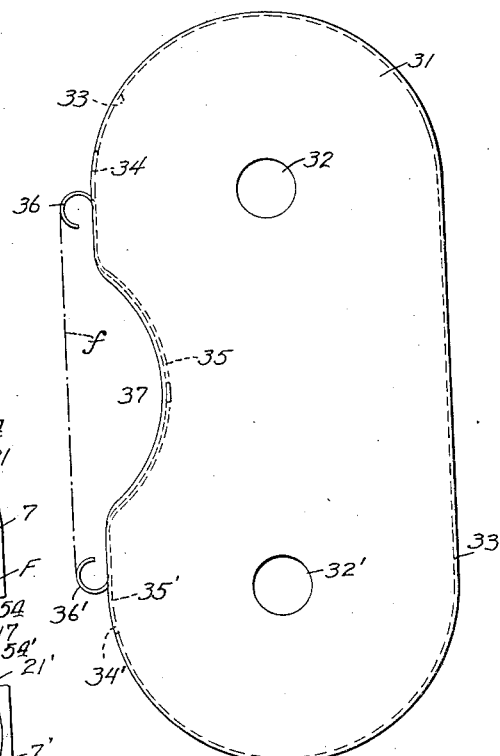
INVENTOR.
WARREN DUNHAM FOSTER.
BY Waldo G. Morse
ATTORNEY.

Oct. 9, 1934.  W. D. FOSTER  1,975,782
MAGAZINE FOR FEEDING MATERIAL
Filed July 14, 1931  2 Sheets-Sheet 2

INVENTOR.
WARREN DUNHAM FOSTER.
BY Waldo G. Morse
ATTORNEY.

Patented Oct. 9, 1934

1,975,782

UNITED STATES PATENT OFFICE 1,975,782

MAGAZINE FOR FEEDING MATERIAL

Warren Dunham Foster, Washington Township, Bergen County, N. J., assignor to Kinatome Patents Corporation, New York, N. Y., a corporation of New York Application July 14, 1931, Serial No. 550,778

42 Claims. (Cl. 88—17)

In the co-pending application of Clarkson Ulysses Bundick and Barton Allen Proctor, Serial Number 44,482, filed July 18, 1925, which upon January 16, 1934, matured as Patent Number 1,944,022, there is described and claimed an improved method and apparatus for feeding material, and particularly a method and apparatus more especially adapted for the feeding of film of the character ordinarily utilized for the taking or projection of so called motion pictures, although the utility of the invention is not limited in this respect.

In such co-pending application means and method are described and claimed whereby a strip of material is passed from one carrier to another, a section of the material intermediate said carriers moved intermittently, and each of the carriers moved continuously but at rates of speed regularly varying in step with such intermittency. This result is therein illustrated as obtained by the introduction of spring pressed tension control arms, each engaging the film between the intermittently moving element and one of the carriers, such arms being mounted upon the film handling apparatus.

The present invention is an improvement upon such application. Instead of mounting the tension control mechanism upon the feeding apparatus, under some conditions it is preferably placed upon the magazine which houses the film. As will be observed from the accompanying drawings, this arrangement may be very simply compactly and inexpensively carried out and has been found to operate very satisfactorily for any ordinary length of film, and to be particularly well adapted for relatively short lengths of film, such as for example, 16 millimeter film of 50, 100 or 200 feet in length.

It will be readily understood by those skilled in the art that in apparatus constructed according to the present invention or the co-pending application, to which reference has been made above, the conventional continuous sprockets with their associated loops of slack film are entirely eliminated, and instead the necessary compensation for the intermittent movement at the aperture of the film feeding apparatus is supplied by a simple, effective and inexpensive device added to the film carrier itself. Other objects of the present invention include the provision of an improved type of tension control mechanism including two elements, one associated with each portion of a hinged magazine and each adapted, when such portions are brought together for closing the magazine, to cooperate with the opening in the other portion to form a light tight or light retarding or dust tight seal. According to a preferred modification, the tension arms are mounted within the magazine and are so arranged that they themselves form a light tight trap at each opening, or, alternatively any desired conventional light retarding means may be employed with the magazine.

Another object of the present invention is to provide a tension controlling magazine in which tension controlling elements are formed integrally with one of the two edge pieces of the magazine, thus entailing practically speaking no additional expense for this important mechanism and requiring no appreciable increase in size of the magazine.

In the accompanying drawings there is shown, for purposes of illustration only, a preferred embodiment of the present invention, it being understood that the drawings do not define the limits of the invention as changes in the construction and operation disclosed therein may readily be made without departing from the spirit of the invention or the scope of the broader claims.

In the drawings:

Figure 1 is a side view of the invention as applied to a hinged magazine.

Figure 2, partly broken away, shows such magazine in closed position, and with the tension arms used as a light trap automatically effective when the magazine is closed.

Figure 3, partly broken away, shows such magazine in open position as applied to the type of film handling apparatus shown and claimed in the co-pending application of Barton Allen Proctor, Serial Number 54,910, filed September 8, 1925, which upon January 24, 1933, matured as Patent Number 1,894,963.

Figure 4 is an edge view taken on the lines 4—4 of Figure 1.

Figure 5 shows the invention as applied to a magazine of the type disclosed in the co-pending application of George William Ford, Serial Number 72,855, filed December 2, 1925, which upon January 16, 1934, matured as Patent Number 1,944,023, and claimed therein and also shown and claimed in application Serial Number 549,067, filed July 6, 1931, which is a continuation in part therefrom.

Figure 6:
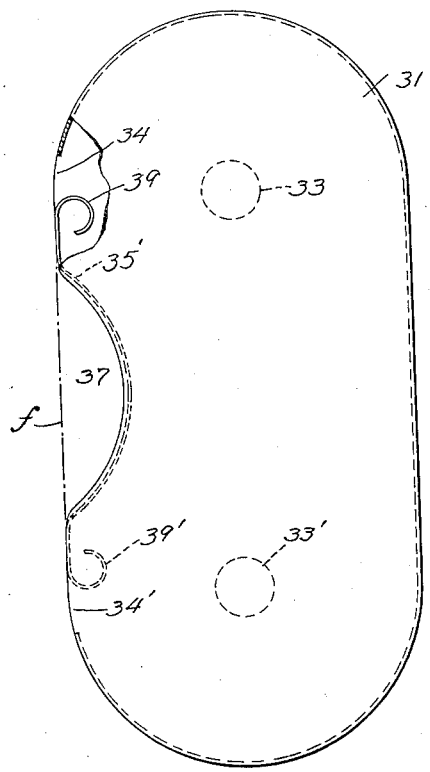

Figure 6, a portion of which is broken away and in section shows the tension control element formed from the side wall of a magazine such as is shown in Figure 5 and extending therewithin.

Figure 7:
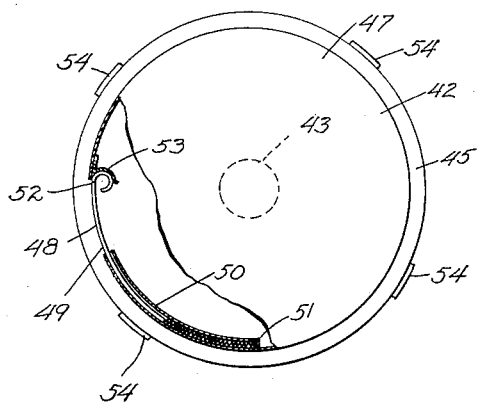

Figure 7, a portion of which is broken away and in section, shows the tension control element applied to the interior of a single magazine and effective also as a light trap.

Figure 8:
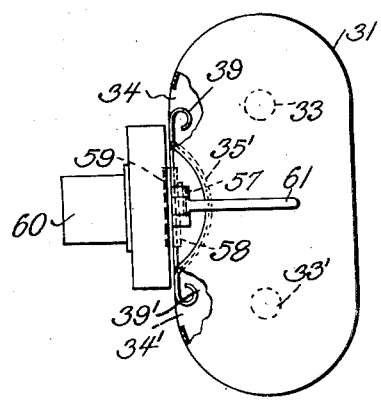

Figure 8 is a diagrammatic representation of the magazine of the type shown in Figure 6 in combination with a film handling apparatus, as shown in the co-pending application of George William Ford, Serial Number 549,067, filed July 6, 1931.

In this specification and in the accompanying drawings, for brevity and simplicity, the reference numbers which are applied to the delivery portion of the magazine and the elements associated therewith are repeated with a prime character added thereto when specifically applied to the take-up portion of the same or similarly constructed magazine and the parts associated therewith, a reference numeral, without the prime character, when associated with such elements which are duplicated for both delivery and take-up magazine including the corresponding part to which the same numeral with a prime character is applied on the drawings.

The present invention is first illustrated, in Figure 1, as applied to a hinged film holder, of the type described and claimed in the co-pending application of Warren Dunham Foster, Serial Number 332,840, filed January 16, 1929, which upon August 9, 1932, matured as Patent Number 1,871,232, said film holder in some respects being an improvement upon that described and claimed in U. S. Patent Number 1,440,173, granted December 26, 1922, to Herbert George Ponting. Such a film holder may comprise a plurality of containers 2 in each of which there may be mounted a spool or other film supporting element 3ª of suitable construction, each container being formed with a spindle receiving opening 3. Each of said containers may be provided with plates 5 projecting therefrom and hingedly connected in any desired manner as by hinges 6, permitting the containers 2 to be swung from and toward each other about the axis of the hinges. The positioning of the plates 5 and the hinge 6 may be such that when the containers are moved away from each other from the position shown in Figure 2 to that shown in Figure 1, they will be in the correct relative positions required by the particular film handling apparatus with which the holder is to be used, as illustrated in Figure 3, and a length of film for projection or exposure will be exposed therebetween. To such plates 5 the casings 7 may be suitably attached. In order to provide the necessary strength and rigidity the plates 5 may be constructed of relatively heavy metal and the casings 7, in order to save weight and expense, may be relatively much lighter.

Each of the containers 2 may be closed on its periphery except for a small opening 8, through which the film passes. These openings may be so positioned relative to the pivotal axis 6 that when the containers are moved toward each other to the position shown in Figure 2, the length of film exposed between them is reduced and the film is protected. One side of each of the openings may be provided with surfaces 9 of suitable construction adapted to cooperate with means later described to provide a complete enclosure for the film. A light trap, independently of such surfaces and means, may be provided if desired.

As shown for purposes of illustration in Figures 1 to 4, inclusive, tension controlling means for the film may be provided in the form of an arcuate plate or arm 12 with a curved film engaging extremity 13, mounted exteriorly of the side of the casing 7, the curved film engaging and being positioned adjacent the openings 8 and as clearly shown in Figure 3 of the drawings, in cooperative relation with the film f. Such mounting may conveniently be in the form of two screws 14 attached to the side of the casing 7 and working in slots 15 cut in the plate 12. An ear 16 may be turned from such plate and form a convenient means whereby the spring 17 may be attached thereto, such spring extending therefrom to the screw 18 conveniently placed through the edge of the casing 7 and into the heavier plate 5. The plate 12 may be formed of resilient material so that the film engaging portion 13 has a cushioning effect, supplemental to that afforded by the spring 17.

For purposes of illustration, in Figure 3 the invention is diagrammatically shown as applied to film handling apparatus substantially of the type shown and claimed in the co-pending application of Barton Allen Proctor, Serial Number 54,910, filed September 8, 1925, which upon January 24, 1933, matured as Patent Number 1,894,962. In such figure the magazine is shown as positioned upon the spindles 21 mounted upon the main frame F which extends upwardly from the base B, the take up spindle 21', according to conventional practice, being frictionally driven. The film passes from the delivery container 7 over the resiliently mounted delivery tension arm 12 over an idler 22 illustrated as positioned at the top of a sectional gate 23 and over the intermittent moving sprocket 24 and the lower tension arm 12' and into the take up container 7'. As the film is fed by such member 24 from the delivery toward the take up spindle, the handling of the film is similar to that described and claimed in the said co-pending Bundick and Proctor Patent Number 1,944,022. In the present application, however, the tension control means are mounted upon the carrier itself instead of upon the film handling apparatus.

In such Patent Number 1,944,022, the present method and means, per se, of film feeding are described and claimed. To summarize this feeding operation as applied to the delivery carrier: As the sprocket 24 revolves the arm 12 is depressed by the traction of the film thereon and energy is stored in the spring 17. While the sprocket 24 is at rest, the spring 17 pulls the arm 12 upwardly, thereby causing an amount of film f to be pulled from the coil within the delivery container 7. Upon the next rotation of the sprocket 24, the film f is again moved downwardly following the impulse transmitted thereto through the film, the portion necessary to compensate for this displacement being the amount of film previously pulled from the delivery coil and in addition that which at the moment is pulled off of such coil. This downward movement of the film f again moves the arm 12, stores up power in the spring 17 which is used during the next period of rest of the sprocket 24 to pull more film from the delivery coil, and that cycle is repeated throughout the entire period of the operation.

If the film engaging roll or member is resilient, the direct pull of film from the delivery coil by the sprocket 24 receives a cushioning effect additional to that provided by the spring 17. When a resilient film engaging member is employed, its resistance to the traction of the film is usually materially less than that of the spring 17; that is to say, that when the roll 13 takes the form of a leaf spring, the magnitude of such spring is usually much less than the magnitude of the spring 17.

The operation between the intermittent sprocket 24 and the taking up coil moved by the take up spindle 21' is analogous to that described above. During the period of rest of the sprocket 24, the spindle 21' moves the film away from such sprocket thereby depressing the lower tension arm 12' and storing up power in its spring 17'. During this phase of operation, the pressure of the spring 17' is such that the friction drive of the spindle 21' is balanced to such an extent that the pull of such spindle upon the film is not transmitted beyond the arm 12' and therefore does not pull the film against the teeth of the sprocket 24 thereby injuring the perforations of the film and making the projected or exposed image unsteady. During the succeeding period of operation of the sprocket 24, such power stored in the spring 17' is effective to move the take up member 12' upwardly, hence tending to move the film away from the sprocket.

Like the corresponding element shown in connection with the delivery reel, the film engaging roll 13' may itself be resilient.

Under many circumstances the modification of my invention shown in Figure 2 will be of distinct utility. As illustrated in such figure, I may enclose the extremities 13 of the arms 12 in a soft light trapping material, such as velvet, as shown at 27, in Figure 2, whereby when the two containers 7 are brought into the adjacent position shown in Figure 2 a completely light-tight enclosing device is provided. Such arrangement is also useful in excluding dust from a film-holder in which positive developed film is housed.

It will be readily understood that the springs 17 will maintain the fabric enclosed rolls 13 in close contact so that an effective closure is provided.

Figure 5 shows the present invention as applied to a magazine of the solid type such as is disclosed and claimed in the co-pending application of George William Ford, now Patent Number 1,944,023. Such a film holder is constructed as a flat box 31, in which are mounted the delivery and receiving coils of the film. Two substantially parallel top and bottom plates, with spindle receiving openings 32 are joined to each other in spaced parallelism by a supporting member 33 which forms the side walls of the case. The film f passes from and to the interior of the case through openings 34. The portion of such side walls 33 between such openings may be formed of a strip 35 of resilient metal terminating in two film engaging rolls 36 each disposed adjacent one of the openings and including a film engaging portion which is curved, such portion being shown as extending exteriorly of the magazine. The film f, shown in chain lines, extends over such film engaging rolls from one to the other. As described and claimed in the co-pending application of the said Ford, identified above as Patent Number 1,944,023 and in his copending application Serial Number 549,067, filed July 6, 1931, which is a continuation in part of such above mentioned co-pending application, the film case 31 is preferably formed with a recess 37 disposed between such openings 34. This recess makes it possible for such a magazine to be placed in a film handling apparatus without displacement of the film from its straight path from one of such film engaging rolls to the other, a portion of the gate and if desired some of the other film handling elements being placed within the space between the film and the interior wall of this recess 37. As will be readily understood, the resilient compensation rolls of the present invention are particularly useful in connection with the above described arrangement since they permit the film to be placed in completely operative relation with the apparatus in which it is to be used without handling or displacement from its previous path, the necessity of the formation of loops of slack film being obviated.

Figure 6 shows a construction similar to that of Figure 5, described immediately above, except that the resilient film engaging rolls 39 are constructed with curved surfaces extending toward the interior of the magazine and therewithin. Such a construction results in a more compact case with the film so positioned that it can easily be protected, both from physical damage by the provision of a simple cover, as is taught in the latest application of the said Ford to which reference has previously been made, and against light by the provision of a suitable trap covering the openings 34.

Figure 7 illustrates, as applied to a single magazine, a preferred modification of our invention in which the tension controlling arm also serves as a light or dust trap.

The film holder 42 may be formed with a spindle receiving opening 43 and may comprise a plate 45 upon which is mounted the protective casing 47. The container may be closed on its periphery except for the opening 48 through which the film passes. The film tensioning member 49 is shown as mounted adjacent such opening and between a side wall of the casing 47 and a guiding plate 50 disposed interiorly thereof and in parallel relation thereto. To move the tension arm 49, a compression spring 51, preferably flat wound, is disposed in the portion of the space between the guiding member 50 and the adjacent wall of the case which is relatively remote from the opening 48. The film engaging portion of the member 49 comprises a curved surface 52 preferably extending toward the interior of the magazine. Cooperating with such surface there may be provided the socket 53, the curve of such socket being similar to the curve of the film engaging portion 52 of the arm 49, preferably with a slight reverse curve at the very extremity. This socket may be a separate piece, or it may be formed in the portion of the side wall adjacent the upper end of the opening 48 as shown in the drawings. For holding the magazine, of this or of one of the previously described types, in the desired relation with the film handling apparatus, the elements 54, which may be resilient as taught in said Foster Patent 1,871,232, may be provided.

During the feeding of a film from or to a film holder constructed as described above, the tension arm 49 operates as before described. When power is no longer applied to the film and through it to the arm 49, the spring 51 moves the arm completely across the opening and closes it, the film being held between the curved film engaging surface 52 and the socket 53. This feature of the invention is particularly useful in connection with a light sensitive film to the leading end of which a protective paper leader strip is attached. Thus such strip rather than the film itself, generally thicker and stiffer than such strip is held as above described. The combination of protective paper and trap is effective to prevent fogging of the film even when the spring 51 is so light that the trap alone affords only a partial closure. It is well known that protective paper alone, even when used with carefully constructed "pill boxes", in the hands of amateurs often does not prevent fogging. If desired, however, this spring can be made of such magnitude that the arm and cooperating socket form a complete closure. Thus it will be understood that this closure is automatically rendered effective when the film feeding stops and ineffective when film feeding starts.

Figure 8 shows a magazine of the type illustrated in Figure 6 applied to a film handling apparatus of the type shown in said copending Ford application Serial Number 549,067, the feeding member 57, gate members 58 and 59, objective lens 60 and positioning member 61 being disposed and operating as therein disclosed.

The present invention, in its various forms, may be applied either to a camera or projector.

Certain of the advantages of the present invention have been set out in the foregoing portion of this specification. Other advantages include the provision of a compensating element, simply constructed, and mounted upon or within the film container, effective as a complete substitute for the conventional continuous sprockets with their associated loops of slack film, such element also serving, if desired, as light protective means or being so arranged as easily to permit the addition of other protective devices. Other advantages arise from the compact, convenient, inexpensive and effective construction and arrangement of the parts, both in relation to themselves and in relation to the film handling apparatus with which the film container to which they are applied is to be used.

I claim:

1. For use in a film handling apparatus, a magazine having inclosing walls adapted to protect a film, and resilient means carried by said magazine and disposed in engagement with the film, for controlling the tension thereof, said means including a film tensioning member shaped to be mounted on one of said walls in a compact, space-conserving relation thereto.

2. For use in a film handling apparatus having film feeding means, a film holder including means for supporting therewithin both the delivery and the take-up coils of a film and having a wall formed with openings therein for rendering the film accessible to said feeding means on its way from one of said coils to the other, and a film path defining member of resilient characteristics cooperating with one of said openings and the relatively adjacent coil for both guiding the film and subjecting it to the desired tensioning effect during the feeding thereof by said film feeding means of said apparatus.

3. For use in a film handling apparatus having film feeding means, a film holder including means for supporting therewithin both the delivery and the take-up coils of a film and having a wall formed with openings therein for rendering the film accessible to said feeding means on its way from one of said coils to the other, and film contacting means extending from one of said openings toward the relatively adjacent coil and terminating in a curved film guiding surface of resilient characteristics which is adapted both to guide the film and subject it to the desired tensioning effect during the feeding thereof by the feeding means of said film handling apparatus.

4. For use in a film handling apparatus having means for feeding a film, a magazine adapted to support and protect the film, and means mounted upon said magazine for controlling the tension of the film, said means including a film engaging member having a relatively long and flat supporting portion of resilient characteristics mounted upon said magazine and a curved extremity engaging the film, said supporting portion being effective during the feeding of the film to maintain said curved extremity in operative engagement with the film.

5. For use in a film handling apparatus having means for feeding a film, a magazine adapted to support and protect the film, and means for controlling the tension of the film, said tension controlling means including a tensioning member mounted upon said magazine and having a curved resilient extremity reciprocably movable while engaging the film during the feeding thereof and means for maintaining said curved resilient extremity in operative engagement with the film during such feeding movement.

6. For use in a film handling apparatus having means for feeding a film, a magazine having enclosing walls and adapted to support and protect the film, means for controlling the tension thereof, and means for maintaining said tension controlling means in operative relation with the film during the feeding operation, said tension controlling means including a film engaging member mounted wholly within said magazine and compactly disposed relative to the adjacent portions of the enclosing walls of said magazine.

7. For use in a film handling apparatus having means for focussing light rays on a film and an intermittent feeding means, a film holder for enclosing and protecting a delivery coil and a take-up coil of film, said holder including approximately flat top and bottom walls spaced apart, and an enclosing side wall disposed between said top and bottom walls, means for defining an indirect film work path from said delivery coil adjacent a portion of said side wall to said take-up coil, said side wall having means for rendering the film accessible to said light rays and to said feeding means along said film path, and a tension controlling auxiliary feeding means, said auxiliary feeding means including a resilient member arranged for reciprocable movement relative to the film in a turn of said film path, said resilient member being mounted on the inside of said holder in compact relation to said side wall.

8. For use in a film handling apparatus having means for focussing light rays upon a film and intermittent feeding member, an oblong film holder for receiving and protecting a delivery coil and a take-up coil the maximum diameters of which are substantially equal to the width of said holder, said holder including approximately flat top and bottom walls spaced apart and an enclosing side wall member disposed between said top and bottom walls, means for defining an indirect film work path from said delivery coil to said take-up coil past said intermittent feeding member and adjacent a portion of said side wall, said side wall having means for rendering the film accessible to said light rays and to said feeding means along said film path, and tension controlling auxiliary feeding means carried by said film holder for cooperation with said feeding means, said auxiliary means including a leaf spring member disposed between said top and bottom walls for engaging the film in a turn of said film path, said spring member being of such contour and so mounted in relation to said side wall as to leave the interior of said holder substantially unobstructed, whereby larger sizes of said film coils may be used in said holder.

9. For use in a film handling apparatus having means for focussing light rays upon a film and an intermittent feeding means, a film holder for protecting a delivery coil and a take-up coil of film, said holder including approximately flat top and bottom walls spaced apart, and an enclosing side wall member disposed between said top and bottom walls, means for defining an indirect film work path from said delivery coil adjacent said side wall member to said take-up coil, said sidewall member having means for rendering the film accessible to said light rays and said intermittent feeding means along said film path, and auxiliary tension-controlling feeding means arranged for cooperation with said intermittent feeding means, said auxiliary means including a resilient member fastened against a portion of said side wall in said holder and disposed for engagement with the film in a turn of said film path, said resilient member being contoured for compactness relative to the adjacent portion of said side wall.

10. For use in a film handling apparatus having means for focussing light rays on a film and an intermittent feeding means for advancing the film, a film holder for protecting a delivery coil and a take-up coil of film, said holder including approximately flat top and bottom walls spaced apart, and an enclosing side wall member disposed between said top and bottom walls, means for creating an indirect film work path from said delivery coil adjacent said side wall member to said take-up coil, said side wall having means for rendering the film accessible to said light rays and said intermittent feeding means along said film path, and a tension-controlling auxiliary feeding means, said auxiliary means including a leaf spring member disposed in close relation to the inner face of said side wall member for engagement with the film in a turn of said film path, said spring member being contoured for compactness relative to the adjacent portion of said side wall.

11. For use in a film handling apparatus for feeding a film under a condition of tension, a magazine including a film protective and enclosing casing for a delivery coil and a take-up coil of film, and means carried by said casing and disposed in engagement with the film as it passes from said delivery coil to said take-up coil for controlling the tension thereof, said means including a member mounted on an enclosing portion of said casing in the plane of said coils for reciprocable sliding movement against said portion of said casing, and a spring attached to said casing and to said member for resiliently maintaining said member in contact with the film during the feeding operation.

12. For use in a film handling apparatus having means for feeding a film under a condition of tension, a magazine including a film protecting and enclosing casing for a delivery coil and a take-up coil of film, a member carried by said casing and disposed in engagement with the film for controlling the tension thereof, said member being mounted for reciprocable sliding movement against an enclosing portion of said casing, a spring attached to said casing and to said member for resiliently maintaining said member in contact with the film, and means for holding said spring closely against said magazine, in order to avoid increasing the bulk of said magazine.

13. For use in a film handling apparatus having means for feeding a film, a magazine adapted to support and protect the film, said magazine comprising a substantially flat container with top, bottom and side walls, said side wall being provided with an opening for rendering the film accessible to said feeding means of said apparatus, and means mounted upon said magazine for controlling the tension of the film, said tension controlling means including a film engaging member extending partly along said side wall and being movable in a direction substantially parallel to said side wall and partly across said opening and means for maintaining said film engaging member in operative relation with the film during the feeding operation.

14. For use in a film handling apparatus having means for feeding a film, a magazine adapted to support and protect the film, said magazine comprising a substantially flat container with top, bottom and side walls, said side wall being provided with an opening for rendering the film accessible to said feeding means, means mounted upon said magazine for controlling the tension of the film, said tension controlling means including a film engaging member extending partly along said side wall and substantially parallel to the contour of said side wall, a spring attached to said member, and means for mounting said spring and said member upon said magazine for maintaining said member in resilient engagement with the film during the feeding thereof.

15. For use in a film handling apparatus having means for feeding a film, a magazine adapted to support and protect the film, said magazine comprising a substantially flat container with top, bottom and side walls, said side wall being provided with an opening for rendering the film accessible to said feeding means, and means mounted upon said magazine for controlling the tension of the film during the feeding thereof and for sealing said opening when the film is not being fed therethrough, said tension controlling means including a film engaging member movably mounted upon said container, a spring attached to said member, and means for mounting said spring and said member upon said magazine for resiliently maintaining said member in contact with the film during the feeding thereof, said member being disposed upon one side of such opening and said spring being effective for moving said member entirely across said opening and said member thereupon being effective for sealing said opening against light.

16. For use in a film handling apparatus having means for feeding a film, a magazine adapted to support and protect the film, said magazine including a protective casing with an opening therein through which the film passes, and means mounted upon said magazine for controlling the tension of the film, said means including a film engaging member adjacent one side of such opening, a spring for moving said member toward the film and across such opening, means for mounting said spring and said member for maintaining said member in operative relation to the film during the feeding operation, and a socket disposed upon the side of such opening opposite that adjacent which said member is mounted, said member and said socket including cooperatingly formed surfaces whereby said opening is sealed upon the movement of said member across said opening and into engagement with said socket.

17. For use in a film handling apparatus, a substantially flat film protective container consisting of top and bottom walls and an enclosing member which maintains said walls in parallel relation to each other, said enclosing member being formed with an opening through which the film passes from or to said container, a fixed guiding member disposed at relatively slight distance from said enclosing member and parallel thereto and adjacent such opening, a spring mounted within the portion of the space between said guiding member and said enclosing member relatively remote from such opening, and a movable guiding member mounted within such space in the portion thereof relatively adjacent such opening whereby said spring urges said movable member across such opening.

18. Apparatus according to claim 17, said movable member being characterized by a curved extremity disposed upon the end thereof adjacent such opening and said enclosing member at the point thereof adjacent the side of said opening opposite that adjacent which said movable member is mounted being characterized by a socket with a curved surface conforming to that upon the extremity of said movable member, whereby upon the movement of said second mentioned member by said spring across such opening such opening is sealed.

19. In a film protective magazine which includes two substantially closed containers hingedly connected to each other, each of said containers being characterized by a peripheral opening through which a film may pass from one to the other and said containers being so disposed relatively to each other that when they are moved apart to a first position a length of film is exposed therebetween for projection or exposure and when they are moved to adjacent relation with each other to a second position such peripheral openings are brought together; a member movably mounted upon each of said containers adjacent such opening therein and a spring for moving each of said members across a portion of the opening thereof, said members being so disposed that when said containers are placed in such second position, said members are spring pressed toward each other, and cooperate with each other and seal such opening.

20. For use in a film handling apparatus, a substantially flat film protective container with top and bottom walls and an enclosing member joining the same for maintaining said walls in parallel relation, said member being formed with two openings through which the film passes, the portion of said member lying between said openings being formed of resilient material and engaging the film adjacent each of said openings.

21. For use in a film handling apparatus, a substantially flat film protective container with top and bottom walls and an enclosing member joining said walls for maintaining the same in parallel relation to each other, said member being formed with two openings through which the film passes, the portion of said member which is disposed between said openings being formed of a strip of resilient material, each end of which terminates adjacent one of such openings in a curved surface so disposed as to engage the film as it passes through such opening.

22. Apparatus according to claim 21, said curved surface being extended in a direction toward the interior of said container.

23. Apparatus according to claim 21, said curved surface being extended in a direction toward the exterior of said container.

24. For use in a film handling apparatus, a substantially flat film protective container having top and bottom walls and an enclosing member joining the same for maintaining said walls in fixed protective relation, said member being formed with two openings through which the film passes, the portion of said member lying between said openings being formed of resilient material and engaging the film adjacent each of said openings, said portion of said member between said openings having a reentrant section for receiving elements of said apparatus.

25. For use in a film handling apparatus, a substantially flat film protective container having top and bottom walls and an enclosing member joining the same for maintaining said walls in fixed protective relation, said member being formed with two openings through which the film passes along a film work path, the portion of said member lying between said openings being formed of resilient material and engaging the film adjacent each of said openings as the film passes from one of said openings to the other, said portion of said member between said openings having a reentrant section for receiving elements of said apparatus, the film engaging sections of said member being so placed that the film while passing along its work path from one of said openings to the other is disposed a substantial distance away from the reentrant section of said resilient member.

26. In combination, a film handling apparatus having means for focussing rays of light upon a film, film feeding means, and means for mounting a film magazine in operative relation thereto, and a film magazine, said film magazine including means for supporting therewithin both the delivery and take-up coils of the film and having a wall formed with means for rendering the film accessible to said light rays and to said feeding means while said magazine is mounted upon said mounting means of said apparatus, and a film path defining member of resilient characteristics mounted upon said magazine and cooperating with said means for rendering the film accessible to said light rays and the coil of the film relatively adjacent thereto for both guiding the film and subjecting it to the desired tensioning effect during the feeding thereof by said film feeding means of said apparatus.

27. In combination, a film handling apparatus, a film protective container for use therewith, and means forming a predetermined path through which the film may be fed from and to said container and through said apparatus while said container is supported upon said apparatus; said apparatus including means for supporting said container thereupon and means for feeding the film through said predetermined path; said container being formed with openings through which the film may be moved by said feeding means through said path from and to the interior of said container, and spring pressed members mounted upon said container adjacent each of said openings; said path forming means and said spring pressed members being so disposed that while said container is supported upon said apparatus said spring pressed members are disposed within bights of the film thereby subjecting it to tension, and means for maintaining said spring pressed members in operative relation to the film during the feeding thereof.

28. In combination, a film handling apparatus, and a film protective container for use therewith, and means forming a predetermined path through which the film may be fed from and to said container and through said apparatus while said container is supported upon said apparatus; said apparatus including means for supporting said container thereupon and means for feeding the film through said predetermined path; said container being formed with an opening whereby the film may be moved by said feeding means through said path from and to the interior of said container, and a spring pressed member mounted upon said container adjacent said opening; said path forming means and said spring pressed member being so disposed that while said container is supported upon said apparatus said spring pressed member is disposed within a bight of the film thereby subjecting it to tension, and means for maintaining said spring pressed member in operative relation to the film during the feeding thereof.

29. In combination, a film handling apparatus, and a film protective container for use therewith, and means forming a predetermined path through which the film may be fed from and to said container and through said apparatus while said container is supported upon said apparatus; said apparatus including means for supporting said container thereupon and means for feeding the film through said predetermined path; said container being formed with an opening whereby the film may be moved by said feeding means through said path from and to the interior of said container, and a spring pressed member mounted upon said container adjacent said opening and having a course of movement completely across said opening whereby said member may seal said opening; said path forming means and said spring pressed member being so disposed that while said container is supported upon said apparatus said spring pressed member is disposed within a bight of the film thereby subjecting it to tension, and means for maintaining said spring pressed members in operative relation to the film during the feeding thereof.

30. In a film handling apparatus having means for focussing light rays on a film and means for supporting a film holder thereupon, the combination with an intermittent feeding means, of a film holder for receiving therein a delivery coil and a take-up coil of film, said holder including approximately flat top and bottom walls spaced apart and an enclosing side wall member disposed between said top and bottom walls, means for defining an indirect film work path from said delivery coil past said intermittent feeding member and adjacent said side wall member to said take-up coil while said holder is supported upon said apparatus, said side wall having means for rendering the film accessible to said light rays and said intermittent feeding means along said film path, and an auxiliary tension controlling feeding member mounted on said holder for cooperation with said intermittent feeding means, said auxiliary feeding member being arranged in compact relation to said side wall member and disposed in a turn of said film path for reciprocable movement during the intermittent feeding of the film.

31. In a film handling apparatus having means for intermittently feeding a film under a condition of tension and means for supporting a film holder upon said apparatus, a film holder for receiving therein a delivery coil and a take-up coil, said holder including approximately flat top and bottom walls spaced apart, and an enclosing side wall member disposed between said top and bottom walls, resilient means carried by said holder and disposed in engagement with the film for controlling the tension thereof, said means including a spring member extending along the plane of a portion of said side wall and being mounted for operative reciprocable movement away from and toward said plane while engaging the intermittently moving ribbon of film to control the tension thereof while said holder is supported upon said apparatus and the film intermittently fed by the feeding means thereof.

32. In a film handling apparatus having means for intermittently feeding a film under a condition of tension and means for supporting a film holder upon said apparatus, a film holder for receiving therein a delivery coil and a take-up coil, said holder including approximately flat top and bottom walls spaced apart, and an enclosing side wall member disposed between said top and bottom walls, means defining an indirect film path between said coils, resilient means carried by said holder and disposed for engagement with the film for controlling the tension thereof, said means including a leaf spring member extending along the plane of a portion of said side wall in compact relation thereto and being mounted in a turn of said film path for operative reciprocable movement away from and toward said plane while engaging the intermittently moving ribbon of film to control the tension thereof while said holder is supported upon said apparatus and the film intermittently fed by the feeding means thereof.

33. In a film handling apparatus for feeding a film under tension and having film contacting parts and means for supporting a film holder upon said apparatus, a film holder having top and bottom walls and an enclosing side wall joining the same for maintaining said walls in fixed protective relation, said side wall having means for rendering the film accessible to said film contacting parts along the film work path of said apparatus while said holder is supported in operative relation to said apparatus, and auxiliary film-tensioning feeding means, said means being mounted on said holder in compact relation thereto so as to prevent either a substantial increase in the bulk of the film holder or a substantial decrease in the film capacity thereof, said auxiliary feeding means being reciprocably movable relative to said film work path adjacent said means for rendering the film accessible to said film contacting parts for controlling the tension of the film.

34. In combination, a film handling apparatus and a film magazine for receiving and protecting a delivery coil of a film and a take-up coil, said apparatus having means for focussing light rays upon the film, intermittently operating feeding means, continuously operating take-up driving means, and means for supporting said magazine upon said apparatus, said magazine including approximately flat top and bottom walls spaced apart and an enclosing side wall disposed between said top and bottom walls, said side wall having means for rendering the film accessible to said light rays and said intermittent feeding means, tension means engaging the film between said intermittent feeding means and said take-up coil for compensating for the difference in character of movement of the film by said intermittent feeding means and said continuously driven take-up coil, and means for mounting said film-engaging means within said magazine in compact relation to said enclosing side wall and for maintaining said film engaging means in operative relation to the film during the operation of said intermittent feeding means and said continuous take-up coil, said supporting means being effective to dispose said magazine upon said apparatus so that the film is placed in proper operative relation to said intermittent feeding means of said apparatus and said take-up coil in operative relation to said take-up driving means of said apparatus.

35. In combination, a film handling apparatus and a film holder for receiving therein a delivery coil and a take-up coil of film, said holder including approximately flat top and bottom walls spaced apart and an enclosing side wall disposed between said top and bottom walls, means for establishing a path of travel for the film from said delivery coil along a portion of said enclosing wall, an intermittently operating toothed feeding member mounted upon said apparatus, said enclosing wall having means for rendering the film accessible by said toothed feeding member while said film holder is operatively supported upon said apparatus, means operatively engageable with said take-up coil while said holder is supported upon said apparatus for continuously driving said coil by said apparatus, means engaging said holder and said apparatus for operatively supporting said holder in such position upon said apparatus that said feeding member is so disposed that it may engage the film and said take-up driving means is so disposed that it may drive said take-up coil, and a tension controlling member carried by said holder therewithin and disposed adjacent said enclosing wall for engaging the film between said toothed member and said take-up coil for relieving the strain upon the film caused by the operation of said take-up coil by said continuous driving means after each intermittent operation of said toothed member.

36. In combination, a film handling apparatus and a film holder for receiving therein a delivery coil and a take-up coil of film, said holder including approximately flat top and bottom walls spaced apart and an enclosing side wall disposed between said top and bottom walls, means for establishing a path of travel for the film from said delivery coil along a portion of said enclosing wall, an intermittently operating toothed feeding member mounted upon said apparatus, said enclosing wall having means for rendering the film accessible by said toothed feeding member while said film holder is operatively supported upon said apparatus, means operatively engageable with said take-up coil while said holder is supported upon said apparatus for continuously driving said take-up coil by said apparatus, means engaging said holder and said apparatus for supporting said holder in such position upon said apparatus that said feeding member is disposed in operative relation to the film and said take-up driving means in operative relation to said take-up coil, and tension controlling means carried by said holder therewithin and including a film engaging surface of relatively large area disposed between said toothed member and said take-up coil adjacent said enclosing wall and so placed as to form a part of said film path and to constitute a bend in the film path thereby assuring operative engagement between said tensioning means and the moving film.

37. In combination, a film handling apparatus and a film holder, said film holder having top and bottom walls and an enclosing side wall joining said top and bottom walls for maintaining said walls in fixed protective relation to the film disposed therewithin, said apparatus and said film holder having means which cooperate while said film holder is supported by said apparatus for defining a film work path, said film handling apparatus having an intermittently operating toothed film feeding member placed thereupon along a portion of said work path, said side wall having means for rendering the film accessible by said toothed feeding member, said apparatus and said film holder having cooperating means for supporting said film holder upon said apparatus so that the film is disposed in operative relation to said intermittent feeding member, and film engaging means auxiliary to said intermittent feeding member of said apparatus for cooperating therewith and controlling the tension of the film, said film engaging means being mounted upon said film holder therewithin in compact relation thereto so as to prevent either a substantial increase in the bulk of the film holder or substantial decrease in the film capacity thereof and being so disposed as to define a portion of said film work path.

38. In combination, a film handling apparatus having means for focussing rays of light upon a film, film feeding means, and means for mounting a film magazine in operative relation thereto, and a film magazine, said film magazine including means for supporting therewithin both the delivery and take-up coils of the film and having a wall formed with means therein for rendering the film accessible to said light rays and to said feeding means while said magazine is mounted upon said mounting means of said apparatus, and a film path defining member of resilient characteristics mounted upon said magazine and cooperating with said means for rendering the film accessible to said light and the coil of the film relatively adjacent thereto for both guiding the film and subjecting it to the desired tensioning effect during the feeding thereof by said film feeding means of said apparatus, said mounting means and said magazine including cooperating surfaces, one of which is resilient.

39. In combination, a film handling apparatus having means for focussing rays of light upon a film, film feeding means, and means for mounting a film magazine in operative relation thereto, and a film magazine, said film magazine including means for supporting therewithin a coil of a film and having a wall formed with an opening therein for rendering the film accessible to said light rays and to said feeding means while said magazine is mounted upon said mounting means, and resilient unitary means carried by said magazine and disposed in engagement with the film for both controlling the tension of the film and excluding light from said opening, said means including a film tensioning member shaped to be mounted on one of said walls in compact, space conserving relation thereto.

40. For use in a film handling apparatus having means for feeding a film, a magazine having enclosing walls adapted to protect a film carried therewithin, one of said enclosing walls having an opening for rendering the film accessible to said feeding means, and resilient unitary means carried by said magazine and disposed in engagement with the film for both controlling the tension of the film and excluding light from said opening, said means including a film tensioning member shaped to be mounted on one of said walls in a compact, space conserving relation thereto.

41. For use in a film handling apparatus having means for intermittently feeding a film, means for continuously driving a take-up coil of the film, and means for focussing light rays upon the film, a magazine arranged for receiving a continuously operable delivery coil and a continuously operable take-up coil, said magazine having approximately flat top and bottom walls spaced apart and an enclosing side wall disposed between said top and bottom walls, said side wall having means for rendering the film accessible to said light rays and said intermittent feeding means, tension-controlling means engaging the film between said intermittent feeding means and said take-up coil and cooperating with each of the same for compensating for the difference in character of movement of the film by said intermittent feeding means and said continuous take-up coil, and means for mounting said film-engaging means within said magazine in compact relation to said enclosing side wall and adapted for maintaining said film-engaging means in operative relation to the film during the operation of said intermittent feeding means and said continuous take-up coil.

42. For use in a film handling apparatus having means for feeding a film, a magazine adapted to support and protect the film, and means mounted upon said magazine for controlling the tension of the film, said means comprising a film engaging member in the form of a leaf spring with a curved film engaging portion and a supporting portion relatively remote from said film engaging portion attached to an adjacent wall of said magazine for maintaining said curved portion in operative engagement with the film during the feeding thereof.

WARREN DUNHAM FOSTER.